United States Patent [19]
Suginoya et al.

[11] Patent Number: 6,061,109
[45] Date of Patent: May 9, 2000

[54] METHOD OF MANUFACTURING A MULTICOLOR LIQUID — CRYSTAL DISPLAY UNIT

[75] Inventors: Mitsuru Suginoya; Tsutomu Matsuhira; Toshihiko Harajiri, all of Chiba, Japan

[73] Assignee: Seiko Instruments Inc., Japan

[21] Appl. No.: 08/623,911

[22] Filed: Mar. 28, 1996

[30] Foreign Application Priority Data

| Mar. 29, 1995 | [JP] | Japan | 7-072127 |
| Sep. 28, 1995 | [JP] | Japan | 7-251529 |
| Dec. 7, 1995 | [JP] | Japan | 7-319380 |

[51] Int. Cl.⁷ ............ G02F 1/1335; G02B 5/20
[52] U.S. Cl. .......... 349/106; 349/110; 349/111; 204/485; 204/486; 205/317; 427/443.1
[58] Field of Search .................. 349/106, 110, 349/111, 187; 430/7, 321, 20; 204/485, 486; 205/316, 317; 427/407.2, 437, 438, 443.1

[56] References Cited

U.S. PATENT DOCUMENTS

| 5,213,850 | 5/1993 | Matsumura et al. | 427/508 |
| 5,305,154 | 4/1994 | Sumi et al. | 349/110 |
| 5,495,354 | 2/1996 | Jo | 349/110 |
| 5,631,753 | 5/1997 | Hamaguchi et al. | 349/110 |
| 5,684,553 | 11/1997 | Fukuchi | 349/110 |

FOREIGN PATENT DOCUMENTS 501694  9/1992  European Pat. Off. .

OTHER PUBLICATIONS

Patent Abstracts of Japan, vol. 18, No. 688 (P–1849) Sep. 30, 1994.
Patent Abstracts of Japan, vol. 15, No. 127 (P–1185) Jan. 21, 1991.
Patent Abstracts of Japan, vol. 18, No. 387 (P–1773) Apr. 22, 1994.
Patent Abstracts of Japan, vol. 17, No. 60 (P–1482) Sep. 25, 1992.
Patent Abstracts of Japan, vol. 13, No. 406 (P–930) Sep. 6, 1989.
Patent Abstracts of Japan, vol. 13, No. 32 (P–817) Sep. 27, 1988.

*Primary Examiner*—Kenneth Parker
*Assistant Examiner*—Tai V. Duong
*Attorney, Agent, or Firm*—Adams & Wilks

[57] ABSTRACT

A method of manufacturing a color filter for a multicolor liquid crystal display unit comprises the steps of forming an organic high-polymer color filter layer over a surface of a substrate. A protective film is then formed on the color filter layer and on the surface of the substrate. Thereafter, a thin metal electroless plating film is formed on the protective film. The electroless plating film is then patterned to form a shading film.

12 Claims, 6 Drawing Sheets

METHOD OF MANUFACTURING A MULTICOLOR LIQUID — CRYSTAL DISPLAY UNIT

BACKGROUND OF THE INVENTION

The present invention relates to a method of manufacturing a color filter and a multicolor liquid-crystal display unit having the color filter, and more particularly to a method of simply manufacturing a color filter substrate, which is suitable for a simple matrix multicolor liquid-crystal display unit as well as a high-image-quality active matrix multicolor liquid-crystal display unit.

PRIOR ART

Figure 3A:
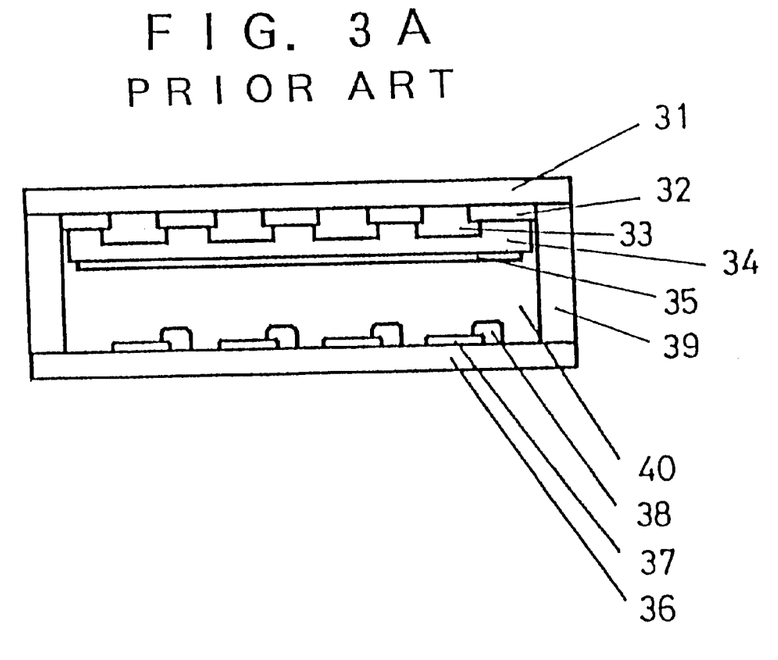
FIG. 3A is a cross-sectional view and FIG. 3B is a front view showing a conventional multicolor liquid-crystal display unit.
Figure 3B:
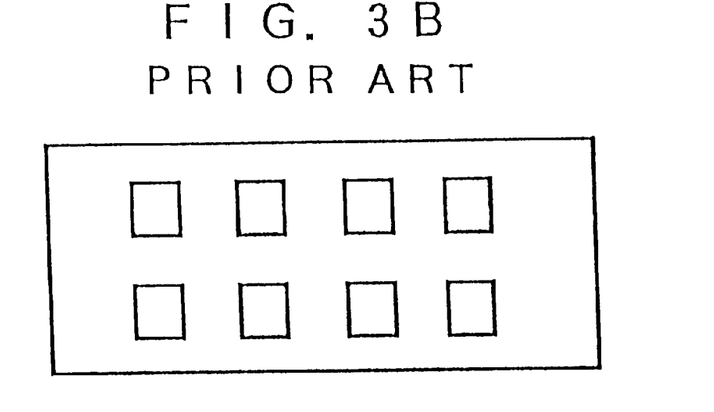

FIGS. 3A and 3B show a cross-sectional view and a front view of a conventional multicolor liquid-crystal display unit. In the figures, reference numeral 31 denotes a glass substrate, and 32 is shading films made of Cr and the like, which are formed on a glass substrate by sputtering and patterned in the form of a lattice. Reference numeral 33 denotes color filters which are formed by patterning a film resulting from mixing a photosensitive resin with pigment or the like. Known methods of manufacturing a color filter are the dyeing technique, the electrodeposition technique, the transfer technique and so on. Reference numeral 34 denotes a protective film made of organic high polymers, which is formed on the color filter 33. Reference numeral 35 denotes a transparent electrode made of ITO for driving liquid crystal, which is formed on the protective film by sputtering, ion-plating, etc. Reference numeral 36 denotes a second substrate on which transparent electrodes 37 and thin-film transistors 38 are formed. The color filter substrate 31 and the thin-film transistor substrate 36 thus formed are bonded together so as to keep a given gap therebetween through a sealant 39, and the gap is filled with liquid crystal 40, thereby forming a multicolor liquid-crystal display unit.

The multicolor liquid-crystal display unit thus formed is excellent in contrast because of the switching characteristic of the thin-film transistor, and has no useless leakage of light because gap portions between color filter pixels are shielded from light by metal Cr. Thus, a high-quality multicolor display unit can be obtained.

Figure 4A:
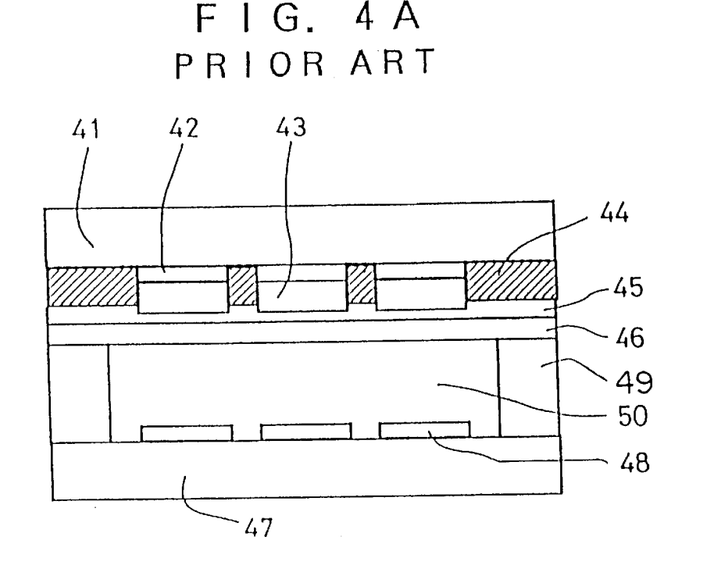
FIG. 4A is a cross-sectional view and FIG. 4B is a front view showing a conventional multicolor liquid-crystal display unit.
Figure 4B:
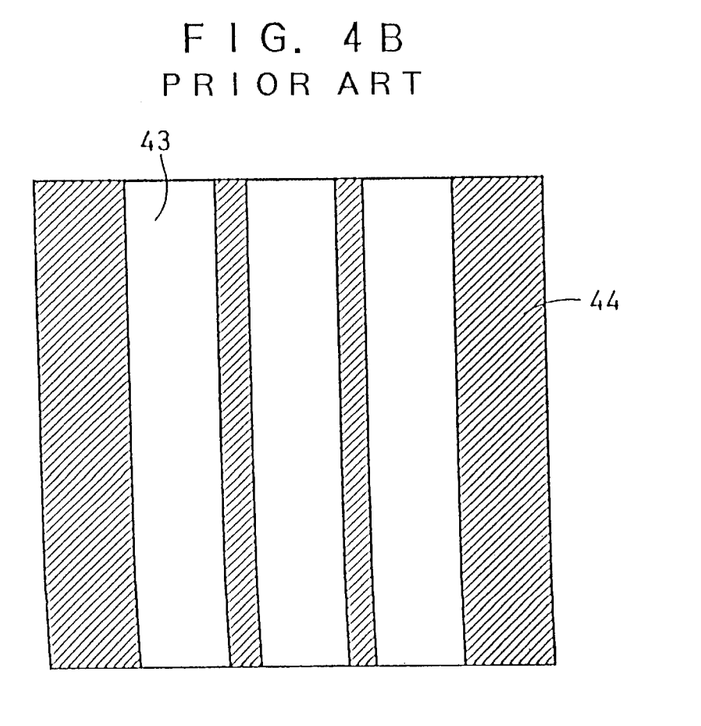

FIGS. 4A and 4B show a cross-sectional view and a front view of another conventional multicolor liquid-crystal display unit, respectively. In the figures, reference numeral 41 denotes a glass substrate, and 42 are transparent electrodes which are made of ITO or the like and patterned in the form of stripes. Reference numeral 43 denotes color filters which are obtained in the following manner. The substrate is immersed in a solution containing high polymers and pigment, and a voltage is selectively applied to the transparent electrodes so that the color filters 43 are deposited on the transparent electrodes 42 by electrodeposition so as to coincide with a stripe-shaped pattern. Reference numeral 44 denotes shading films which are obtained in the following manner. A photoresist to which black pigment is added is coated on the color filters, and the photoresist is exposed from the back surface of the substrate with the color filters as a photo mask, whereby the shading films 44 are formed on only the gaps between the color filters in a self-alignment. Reference numeral 45 denotes a protective film made of organic high polymers, which is formed on the color filters 43. Reference numeral 46 denotes a transparent film made of ITO for driving liquid crystal, which is formed on the protective film through sputtering, ion plating, etc., and then patterned. Reference numeral 47 denotes a second glass substrate on which a transparent electrode 48 is formed in the form of stripes. The color filter substrate 41 and the opposing substrate 47 thus formed are bonded together so as to keep a given gap therebetween through a sealant 49, and the gap is filled with liquid crystal 50, thereby forming a multicolor liquid-crystal display unit.

The multicolor liquid-crystal display unit thus formed shields the gaps between the color filters from a light through a simple self-alignment process.

In the above-mentioned multicolor liquid-crystal display unit shown in FIG. 3, since a shading film is formed through the vacuum sputtering technique with Cr, such a formation is not simple and makes it hard to lower the costs from the industrial viewpoint.

Also, although the shading film has a complete light shielding action because it is made of metal, it adversely reflects an external light. This causes such a defect that a screen glitters with a reflected light. In order to overcome this defect, an attempt has been made to have the shading film made of a photosensitive material containing black pigment such as carbon as shown in FIG. 4. However, the shading ratio as high as that of metal cannot be obtained. Also, there has been proposed a two-layer shading film consisting of chromium oxide and chromium. However, the formation of this film requires vacuum sputtering twice, making the process very complicated.

On the other hand, the method of forming a color filter due to electrodeposition shown in FIG. 4 is of a simple color filter manufacturing method. However, because pixels of the same color must be made electrically conductive in the formation of the color filter due to electrodeposition, independent pixels such a square cannot be basically formed, but stripe-shaped color filters are formed as shown in FIG. 4B. In this situation, because what is applied with a voltage is a pixel on an independent square portion which are cross points between the color filters and the lateral stripe electrodes of the opposing substrate, although the shading films are formed on the gap portions between the color filters in the lateral direction of pixels, gaps being in parallel to pixels arranged longitudinally along the stripe are not completely shielded from a light with only the color filters formed on the gaps. This causes a serious difficulty for eliminating a stray light and obtaining a high contrast.

SUMMARY OF THE INVENTION

In order to solve the above-mentioned problem, the present invention comprises the steps of:

1) forming a color filter made of organic high polymers on a substrate;

2) forming a thin film mainly containing a metal on a substrate on which the color filter is formed through electroless plating; and 3) patterning the thin film mainly containing the metal to form a shading film, thereby manufacturing a color filter substrate.

As a result, the periphery of pixels in the multicolor display unit is completely shielded from a light with a very simple method so that a light can be prevented from leaking from the periphery of the pixels. Also, the composition of electroless plating and an after-treatment are adjusted so as to lose a gloss and prevent display from glittering with an external light. This causes the provision of a multicolor liquid-crystal display unit that eliminates a stray light and further improves a display quality and contrast.

Further, the present invention provides a method of simply providing a high-quality color filter, comprising the steps of:

1) forming a plurality of transparent electrodes on a substrate;

2) forming color filters made of high polymers on said transparent electrode by electrodeposition;

3) forming a shading film made of high polymers on gaps between said color filters;

4) forming a thin film mainly containing a metal on at least said color filters or said shading film through electroless plating; and 5) patterning said thin film mainly containing said metal to form a second shading film, to thereby manufacture a color filter substrate. As a result, with a very simple method, the pixel periphery of the multicolor display unit is perfectly shielded from a light, thereby eliminating a leakage of light from the pixel periphery. Also, in the outer surface of the display unit, no metal gloss of electroless plating appears on a display surface because of the color filters or the shading films made of high polymers and loses gloss, thereby being capable of preventing display from glittering with an external light. As a result, there is provided a multicolor liquid-crystal display unit that eliminates a stray light and further improves a display quality and contrast.

The point of the present invention resides in that a thin film is formed on a color filter through electroless plating. Because an external light entering through the glass is incident to the shading film through the color filter and the protective film with the shading film being formed on the color filter, the entire reflectance can be restrained even though the shading film has a metal gloss. Also, electroless plating is of a simple method in which a film can be formed by merely making the substrate immersing in a solution and which requires no vacuum equipment as in the sputtering technique.

Further, with the formation of the metal shading films on the electrodeposition color filters and a resin such as the shading films made of high polymers through electroless plating, an external light entering through the glass is absorbed by the color filters and the shading films made of high polymers so that the reflectance is remarkably restrained.

The electroless plating is of a method of reducing and depositing metal ions in a solution to form a film on a substrate surface, and a method using a chemical reducing agent is normally called electroless plating. Some conditions required for forming electroless plating are recited as follows:

(1) The oxidation-reduction potential of a reducing agent that reduces metal ions in a solution is sufficiently lower than a balancing potential of that metal (metal deposition progresses).

(2) A plating solution is not reacted in a state where the respective components remain blended without any change, but reacted first when it is in contact with a catalytic surface (the plating solution is stabilized).

(3) The rate of reducing reaction can be controlled by adjusting pH and temperature of a solution (adjustment of plating rate).

(4) The metal per se which is reduced and deposited has a catalysis (growth of thickness of a plating film).

(5) The oxide of a reducing agent does not obstruct the progress of plating reaction (the lifetime of plating solution is elongated).

Applicable metals that satisfy those conditions are periodic law VIII group metals of a strong catalysis (for example, nickel, cobalt, palladium, etc.), alloys of those metals, Ib subgenus metals (copper, silver, gold) having a weak catalysis but a relatively higher potential, etc. The reducing agent as used is selected in accordance with the sort of a plating metal and the property of a plating film. In other words, in the plating of nickel or cobalt, there is used hypophosphite, boron hydride compound or hydrazine compound which is strong in reducing power, whereas in the plating of copper, silver or gold, there is used formaldehyde, Rochelle salt, grape sugar or other organic chemicals which are weak in reducing power.

The structure of a basic electroless plating bath consists of metal salt, reducing agent, pH regulator, buffer, acetylator, stabilizer and improving agent. In nickel plating as one example, the metal salt is of nickel sulfate, nickel nitrate, nickel carbonate, nickel cyanide, nickel ammonium sulfate. The reducing agent is of sodium hypophosphite, sodium pyposulfate, sodium sulfur dioxide, hydrazinium chloride, hydroquinone, formalin, etc. As the buffer, there is used alkali salt such as acetic acid, butyric acid or tartaric acid.

When a nonconductor such as an organic high polymer is a base body, a before-treatment for activating the surface by catalyzer is required. In the case of nickel plating, the before-treatment is conducted by immersing the base body in stannous chloride solution of about 1% and palladium chloride of about 0.1%.

The process of electroless plating will be described hereinafter with an example of nickel plating.

1) cleaning 2) attaching tin and palladium catalyzer to the surface (3) removing the catalyzer on a useless portion)

4) nickel plating 5) annealing

The ratio of metal positive ions to negative ion of a reducing agent when plating determines the property of a film. In the case of nickel plating, a plating film is not made of pure nickel, but phosphorus used as a reducing agent and tin and palladium used as a catalyzer enter the interior of the film. Also, the plating film is metallically glossed or comes into a black compound depending on a value of $Ni^{2+}/H_2PO_2^-$.

In the present invention, such an electroless plating film is applied to the shading film for a multicolor display unit, thereby being capable of obtaining a shading film which is simple, optically varied and optimum to the display unit.

Also, in the present invention, such an electroless plating film is applied to the electrodeposition and the shading film on the shading films made of high polymer, thereby being capable of obtaining a shading film which is simple and optimum to the display unit with a low reflectance.

DETAILED DESCRIPTION OF THE DRAWINGS

DETAILED DESCRIPTION OF THE PREFERRED EMBODIMENTS

Hereinafter, a description will be given in detail of the effect of the present invention on the basis of embodiments.

(Embodiment 1)

Figure 1:
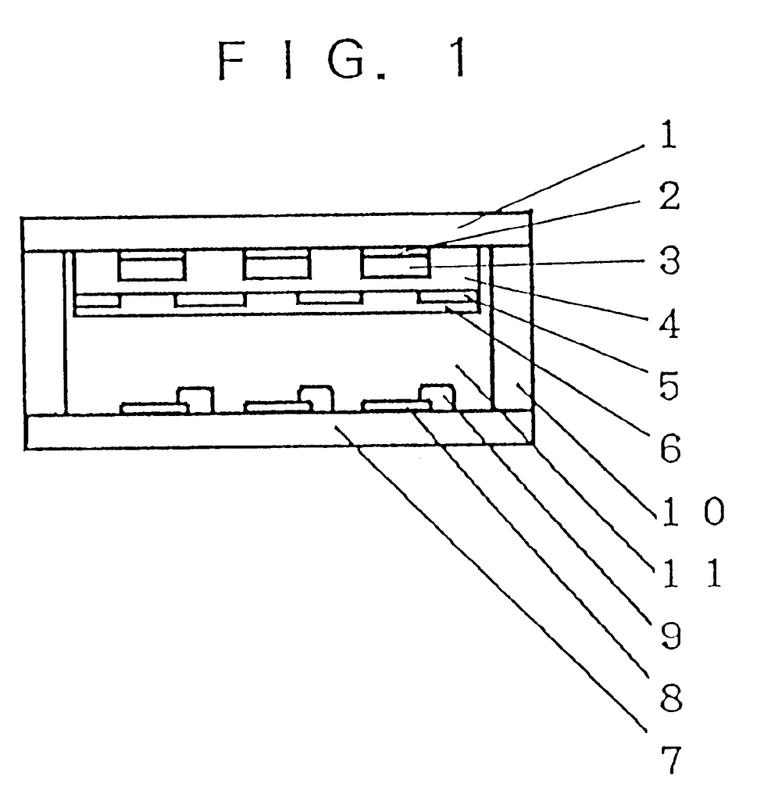
FIG. 1 is a cross-sectional view showing a multicolor display unit in accordance with the present invention.

FIG. 1 shows a cross-sectional view of a multicolor liquid-crystal display unit in accordance with the present invention. In the figure, reference numeral 1 denotes a glass substrate, and 2 is transparent electrodes made of ITO or the like, which are patterned in the form of stripes. Reference numeral 3 denotes color filter layers (hereinafter referred to as color filters 3) made of high polymers and pigment, which are formed on the transparent electrodes 2 by electrodeposition so as to coincide in shape with pixels. Reference numeral 4 denotes a protective film made of organic high polymers, which are coated on the color filters 3. Reference numeral 5 denotes shading films formed of electroless plating films that mainly contain nickel. Those elements constitute a color filter (hereinafter referred to as a color filter substrate). Reference numeral 6 denotes a transparent electrode made of ITO for driving liquid crystal, which is formed on the color filter substrate through the low-temperature sputtering technique, the ion plating technique or the like.

FIG. 5 shows cross-sectional views 5A to 5E and front views 5A' to 5E' representative of a method of manufacturing the above-mentioned color filter substrate. In FIGS. 5A and 5A', reference numeral 51 denotes a glass substrate having a surface on which ITO is formed by sputtering and other treatments and then patterned to form transparent electrodes 52 in the form of stripes. In FIGS. 5B and 5B', color filters 53 are formed on the transparent electrode 52 through electrodeposition by repeatedly energizing the transparent electrode 52 selectively in red, green and blue solutions consisting of a polyester resin or acrylic resin and pigment. More specifically, in this embodiment the color filters 53 are formed over the surface of the substrate 51 except for preselected surface portions 51a thereof. In FIGS. 5C and 5C', a protective film 54 made of an acrylic resin is formed on the color filters 53 by a spinner or the like. In FIGS. 5D and 5D', an electroless plating film 55 mainly containing nickel is formed on a surface of the protective film 55 over the color filter substrate through processes shown in Table 1.

TABLE 1

Figure 5A:
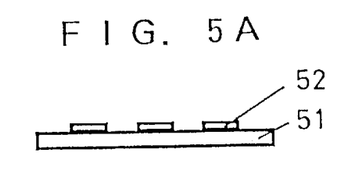
FIGS. 5A–5E and 5A'–5E' are diagrams showing processes of manufacturing a color filter substrate in accordance with the present invention.
Figure 5B:
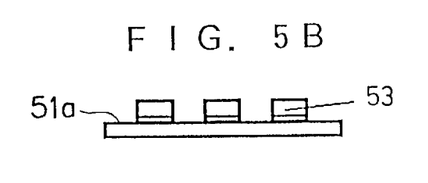
Figure 5C:
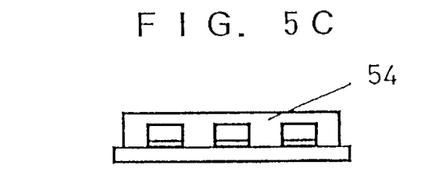
Figure 5D:
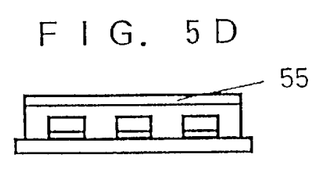
Figure 5E:
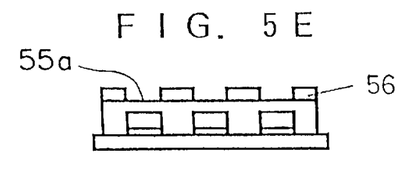

In FIGS. 5E and 5E', a photoresist is coated on the electroless plating film thus manufactured, and then etched in a ferric chloride solution after exposure and development processes, to thereby form a shading film 56 on the surface of the protective film 55 except for preselected surface portions 55a thereof. In this embodiment, the shading film 56 is formed directly over the preselected surface portions 51a of the substrate 51. In this example, the shading film is made of nickel which is mixed with phosphorus, palladium, tin and so on.

Returning to FIG. 1, a method of manufacturing the multicolor display unit will be described. The color filter substrate thus manufactured and a second glass substrate 7 on which pixel transparent electrodes 8 and thin-film transistors 9 are formed are bonded together so as to keep a given gap therebetween through a sealant 10, and the gap is filled with liquid crystal 11, thereby forming a multicolor liquid-crystal display unit.

The multicolor liquid-crystal display unit thus manufactured perfectly shields the entire pixel periphery from a light and exhibits a high display quality without any deterioration of the characteristic of the thin-film transistor due to a light, regardless of being manufactured in a simple method. Also, because a metal film is not in contact with the glass directly, reflection is restrained, and a reflected light on the screen is reduced.

(Embodiment 2)

In this embodiment, electroless plating is conducted directly on the color filter substrate without the protective film 4 used in the embodiment 1 being coated on the color filter substrate. In this example, since gaps between the respective color filters are made of glass, a process of removing catalyzer on a useless portion is not conducted in the electroless plating process, but electroless plating is conducted on the entire front and back surfaces of the substrate. In addition, the amount of sodium hypophosphite as used is increased by 2%, and the multicolor liquid-crystal display unit is then manufactured in the same manner as that in the embodiment 1.

In this embodiment, a film is attached onto the front and back surfaces of the substrate, and both the surfaces must be etched. However, because the film deposited by electroless plating has no metal gloss and is made of black material, the shading film is low in reflectance, no external light is reflected from the screen, and an excellent display quality is obtained in addition to the effects described in the embodiment 1.

(Embodiment 3)

In this embodiment, chemicals used in an electroless plating process of an electroless plating process in accordance with the embodiment 1 are a solution of cobalt sulfate, sodium hypophosphite and sodium tartrate, and a shading film is manufactured from an electroless plating film that mainly contains cobalt.

Subsequently, the multicolor display unit is manufactured in the same manner of that in the embodiment 1. As a result, the same effects as those in the embodiment 1 are obtained.

(Embodiment 4)

In this embodiment, chemicals used in an electroless plating process of an electroless plating process in accordance with the embodiment 1 are a solution of copper sulfate, Rochelle salt, sodium hydroxide and formalin, and a shading film is manufactured from an electroless plating film that mainly contains copper.

Subsequently, the multicolor display unit is manufactured in the same manner of that in the embodiment 1. As a result, the same effects as those in the embodiment 1 are obtained.

(Embodiment 5)

In this embodiment, chemicals used in an electroless plating process of an electroless plating process in accordance with the embodiment 1 are liquid silver (nitric acid, aqueous ammonia) and a reducing solution (formaldehyde water), and after being sequentially immersed in the liquid silver and the reducing solution, a shading film is manufactured from an electroless plating film that mainly contains silver oxide by annealing in an oxygen atmosphere.

Subsequently, the multicolor display unit is manufactured in the same manner of that in the embodiment 1. As a result, the same effects as those in the embodiment 1 are obtained. As a result, in this embodiment, because the film deposited by electroless plating is made of black material that mainly contains silver oxide and has no metal gloss, the shading film is low in reflectance, no external light is reflected from the screen, and an excellent display quality is obtained in addition to the effects described in the embodiment 1.

(Embodiment 6)

Figure 2A:
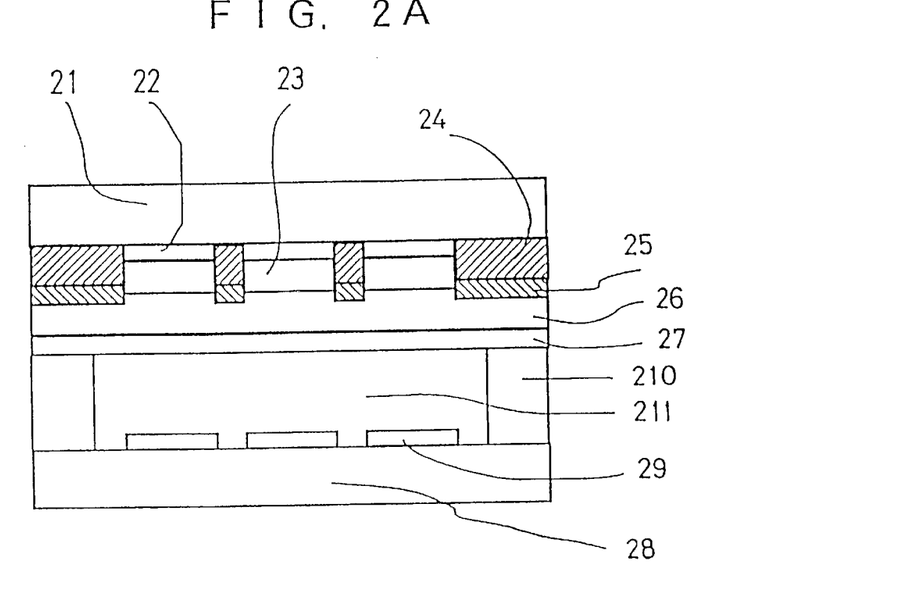
FIG. 2A is a cross-sectional view and FIG. 2B is a front view showing a multicolor liquid-crystal display unit according to the present invention.
Figure 2B:
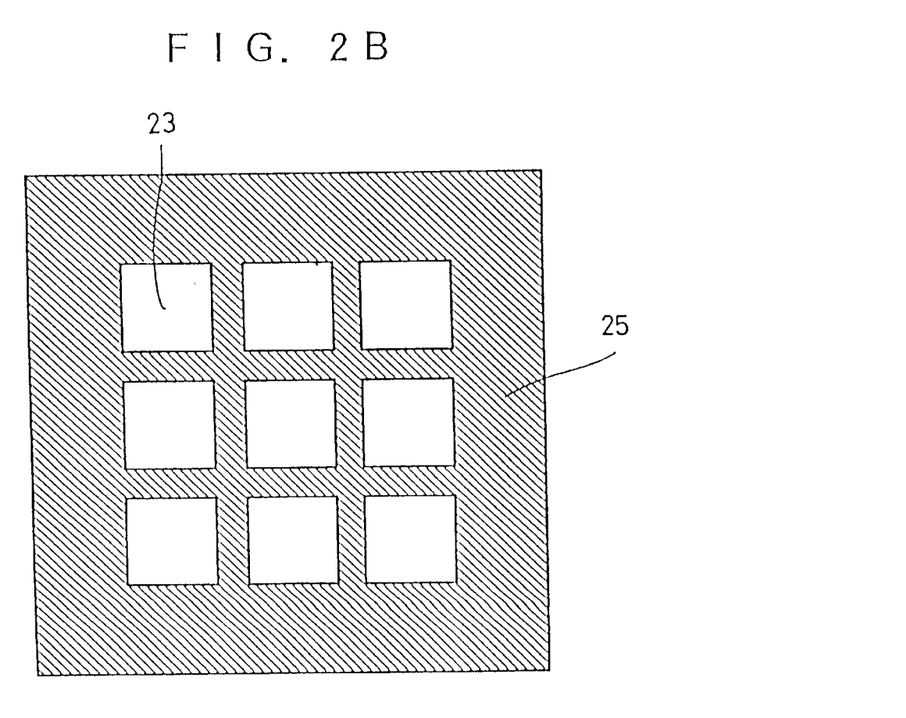

FIG. 2 shows a cross-sectional view of a multicolor liquid-crystal display unit in accordance with the present invention. In the figure, reference numeral 21 denotes a glass substrate, and 22 is a transparent electrode made of ITO or the like, which are patterned in the form of stripes. Reference numeral 23 denotes color layers (hereinafter referred to as color filters 23) made of high polymers and pigment, which are formed on the transparent electrodes 22 by electrodeposition so as to coincide in shape with pixels. Reference numeral 24 denotes shading films which are made of black pigment and organic high polymers and formed in the following manner. A photoresist to which the black pigment is added is coated on the color filters 23, and the photoresist is exposed from the back surface of the substrate with the color filters as a photo mask, thereby forming the shading films 24 on only gaps between the color filters in a self-alignment. Reference numeral 25 denotes a second shading film formed of an electroless plating film that mainly contains nickel therein. After the second shading film 25 has been formed by patterning, an insulating protective film 26 made of organic resin is formed on the second shading film 25. Reference numeral 27 denotes a transparent electrode made of ITO for driving a liquid crystal 211 and is formed on the color filter substrate by low-temperature sputtering, ion plating or the like. The transparent electrode 27 is formed on the insulating protective film 26 by patterning.

FIG. 6 shows cross-sectional views and front views of a method of manufacturing the above-mentioned color filter substrate. In FIGS. 6A and 6A', reference numeral 61 denotes a glass substrate having a surface on which ITO is formed by sputtering, etc., and then patterned to form transparent electrodes 62 in the form of stripes. In FIGS. 6B and 6B', color filters 63 are formed on the transparent electrode 62 through electrodeposition by repeatedly energizing the transparent electrode 62 selectively in red, green, and blue solutions consisting of a polyester resin or acrylic resin and pigment. More specifically, in this embodiment the color filters 63 are formed over the surface of the substrate 61 except for preselected surface portions 61a thereof. In FIGS. 6C and 6C', a mixture film consisting of black pigment and a negative resist are formed on the color filters 63 by a spinner or the like, and the negative resist is exposed from the back surface of the substrate with the color filters as a photo mask, to thereby form shading films 64 made of high polymers respectively disposed on the preselected surface portions 61a of the substrate 61. In FIGS. 6D and 6D', an electroless plating film 65 mainly containing nickel is formed on the color filter substrate through the processes shown in Table 2.

TABLE 2

Figure 6A:
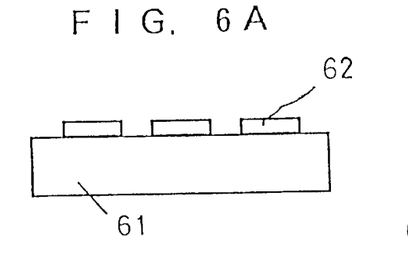
FIGS. 6A–6E and 6A'–6E' are diagrams showing processes of manufacturing a color filter substrate in accordance with the present invention.
Figure 6B:
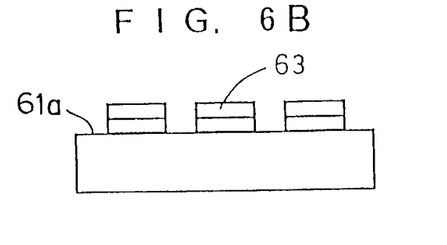
Figure 6C:
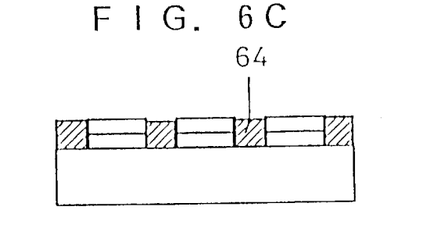
Figure 6D:
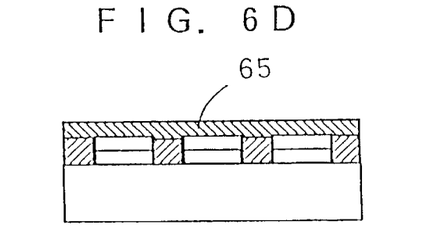
Figure 6E:
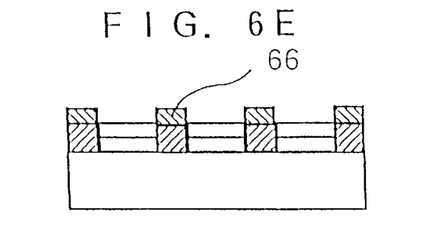

In FIG. 6E, a photoresist is coated on the electroless plating film thus manufactured, and then etched in a ferric chloride solution after exposure and development processes, to thereby form second shading films 66. In this example, the shading film is made of nickel which is mixed with phosphorus, palladium, tin and so on.

Returning to FIG. 2, a method of manufacturing the multicolor display unit will be described. The color filter substrate thus manufactured and a second glass substrate 28 on which transparent electrodes 29 are formed are bonded together so as to keep a given gap therebetween through a sealant 210, and the gap is filled with the liquid crystal 211, thereby forming a multicolor liquid-crystal display unit.

The multicolor liquid-crystal display unit thus manufactured perfectly shields the entire pixel periphery from a light, obtains high contrast and exhibits a high display quality regardless of being manufactured in a simple method. Also, because the color filters and the shading films made of high polymers exist between the metal film and the glass, reflection is eliminated, and there is no light reflected from the screen.

(Embodiment 7)

In this embodiment, chemicals used in an electroless plating step of an electroless plating processing in accordance with the embodiment 6 are a solution of cobalt sulfate, sodium hypophosphite and sodium tartrate, and shading films are manufactured from an electroless plating film that mainly contains cobalt.

Subsequently, the multicolor display unit is manufactured in the same manner of that in the embodiment 6. As a result, the same effects as those in the embodiment 6 are obtained.

(Embodiment 8)

In this embodiment, chemicals used in an electroless plating step of an electroless plating processing in accordance with the embodiment 6 are a solution of copper sulfate, Rochelle salt, sodium hydroxide and formalin, and shading films are manufactured from an electroless plating film that mainly contains copper.

Subsequently, the multicolor display unit is manufactured in the same manner of that in the embodiment 6. As a result, the same effects as those in the embodiment 6 are obtained.

(Embodiment 9)

In this embodiment, chemicals used in an electroless plating step of an electroless plating processing in accordance with the embodiment 6 are liquid silver (nitric acid, aqueous ammonia) and a reducing solution (formaldehyde water), and after being sequentially immersed in the liquid silver and the reducing solution, shading films are manufactured from an electroless plating film that mainly contains silver oxide by annealing in an oxygen atmosphere.

Subsequently, the multicolor display unit is manufactured in the same manner of that in the embodiment 6. As a result, the same effects as those in the embodiment 6 are obtained.

As was described in detail with reference to the embodiments, a method of manufacturing a multicolor liquid-crystal display unit in accordance with the present invention includes the steps of:

1) forming a color filter made of organic high polymers on a substrate;
2) forming a thin film mainly containing a metal on a substrate on which the color filter is formed through electroless plating; and
3) patterning the thin film mainly containing the metal to form a shading film, thereby manufacturing a color filter substrate. As a result, the pixel periphery of the multicolor display unit is completely shielded from a light through a very simple method, thereby being capable of eliminating a leakage of light from the pixel periphery. Therefore, visual contrast of the display unit can be improved. Also, a method of manufacturing a multicolor liquid-crystal display unit applying a color filter in accordance with the present invention, includes the steps of:

1) forming a plurality of transparent electrodes on a substrate;
2) forming color filters made of high polymers on said transparent electrode by electrodeposition;
3) forming a shading film made of high polymers on gaps between said color filters;
4) forming a thin film mainly containing a metal on at least said color filters or said shading film through electroless plating; and
5) patterning said thin film mainly containing said metal to form a second shading film, thereby manufacturing a color filter substrate.

As a result, the pixel periphery of the multicolor display unit is completely shielded from a light through a very simple method, thereby being capable of eliminating a leakage of light from the pixel periphery. Therefore, visual contrast of the display unit can be improved. Also, because the shading film made of high polymers and the color filters exist on the display surface side, there is no reflection caused by metal gloss, thereby being capable of preventing display from glittering with an external light. Hence, a multicolor liquid-crystal display unit that eliminates a stray light and a light reflected from the screen and further improves a display quality is obtained.

What is claimed is:

1. In a method of manufacturing a multicolor liquid crystal, the improvement comprising the steps of:
    forming a plurality of transparent electrodes on a surface of a substrate;
    forming a plurality of high-polymer color filter layers on the transparent electrodes by electrodeposition, the color filter layers being formed in spaced-apart relation to define gaps therebetween;
    forming a first shading film in the gaps between the color filter layers;
    forming a thin metal electroless plating film on at least the first shading film; and
    patterning the thin metal electroless plating film to form a second shading film.

2. A method as claimed in claim 1; further comprising the steps of
    forming an insulating film on the second shading film; and
    forming a transparent electrode on the insulating film.

3. A method as claimed in claim 1; wherein the thin metal electroless plating film comprises at least a metal selected from the group consisting of nickel, cobalt, copper and silver.

4. A method as claimed in claim 1; wherein the step of forming the color filter layers includes the step of sequentially and selectively energizing the transparent electrodes in solutions of high-polymer materials and pigments to form the color filter layers by electrodeposition.

5. A method as claimed in claim 1; wherein the thin metal electroless plating film has light-unreflecting and light-absorbing characteristics.

6. A method as claimed in claim 1; wherein the second shading film is formed directly on the first shading film.

7. In a method of manufacturing a multicolor liquid crystal display unit, the improvement comprising the steps of: providing a substrate; forming a plurality of transparent electrodes on the surface of the substrate except for preselected surface portions thereof; energizing the transparent electrodes in solutions of high-polymer organic materials and pigments to form a plurality of high-polymer color filter layers on the transparent electrodes by electrodeposition; forming a first high-polymer shading film on the preselected surface portions of the substrate; forming an electroless plating film on the high-polymer color filter layers and on the first high-polymer shading film; and patterning the electroless plating film to form a second shading film on the first high-polymer shading film.

8. A method as claimed in claim 7; further comprising the steps of forming an insulating film on the second high-polymer shading film; and forming a transparent electrode on the insulating film.

9. A method as claimed in claim 7; wherein the electroless plating film comprises at least a metal selected from the group consisting of nickel, cobalt, copper and silver.

10. A method of manufacturing a color filter, comprising the steps of: providing a substrate;
    forming a plurality of transparent electrodes on the surface of the substrate except for preselected surface portions thereof; energizing the transparent electrodes in solutions of high-polymer organic materials and pigments to form a plurality of high-polymer color filter layers on the transparent electrodes by electrodeposition;
    forming a first high-polymer shading film on the preselected surface portions of the substrate; forming an electroless plating film on the high-polymer color filter layers and on the first high-polymer shading film; and
    patterning the electroless plating film to form a second shading film on the first high-polymer shading film.

11. A method as claimed in claim 10; further comprising the step of forming an insulating film on the second high-polymer shading film.

12. A method as claimed in claim 10; wherein the electroless plating film comprises at least a metal selected from the group consisting of nickel, cobalt, copper and silver.

* * * * *